(12) United States Patent
Hamilton et al.

(10) Patent No.: US 8,083,179 B2
(45) Date of Patent: Dec. 27, 2011

(54) COMPOSITE MATERIAL FOR GEOMETRIC MORPHING WING

(75) Inventors: Brian K. Hamilton, Mesa, AZ (US); Ahmed Hassan, Mesa, AZ (US); Terrence S. Birchette, Chandler, AZ (US); Robert R. Murrill, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/883,957

(22) Filed: Sep. 16, 2010

(65) Prior Publication Data

US 2011/0001018 A1 Jan. 6, 2011

Related U.S. Application Data

(62) Division of application No. 11/612,244, filed on Dec. 18, 2006, now Pat. No. 7,798,443.

(51) Int. Cl.
*B64C 3/38* (2006.01)
*B64C 5/10* (2006.01)
*B64C 9/00* (2006.01)
*B64C 13/00* (2006.01)

(52) U.S. Cl. .................. 244/99.8; 244/198; 244/219

(58) Field of Classification Search ............. 244/198, 244/200, 201, 219, 46, 99.8
See application file for complete search history.

(56) References Cited

U.S. PATENT DOCUMENTS

| | | |
|---|---|---|
| 2,504,684 A | 4/1950 | Harper |
| 2,937,826 A | 5/1960 | Johnson |
| 2,979,287 A | 4/1961 | Ross |
| 3,893,639 A | 7/1975 | Croswell |
| 3,957,232 A | 5/1976 | Sebrell |
| 4,261,534 A | 4/1981 | Roselli |
| 4,485,321 A | 11/1984 | Klicker |
| 4,494,715 A | 1/1985 | Weisend |
| 4,508,295 A | 4/1985 | Cattaneo |
| 4,687,159 A | 8/1987 | Kageorge |
| 4,824,053 A | 4/1989 | Sarh |
| 4,836,474 A | 6/1989 | Briscoe |
| 4,845,357 A | 7/1989 | Brennan |
| 5,114,104 A | 5/1992 | Cincotta |
| 5,150,864 A | 9/1992 | Roglin |

(Continued)

FOREIGN PATENT DOCUMENTS

FR 2568216 A1 1/1986

(Continued)

OTHER PUBLICATIONS

Harris, J.T. et al., "Structural Fabric Program," Accession No. AD0271473, Dec. 1961, available from Defense Technical Information Center, http://stinet.dtic.mil/.

(Continued)

*Primary Examiner* — Tien Dinh
*Assistant Examiner* — Philip J Bonzell
(74) *Attorney, Agent, or Firm* — Ostrager Chong Flaherty & Broitman P.C.

(57) ABSTRACT

An airfoil member and an airfoil member altering system are provided for significantly modifying the shape and size of the airfoil member while simultaneously providing an airfoil member with increased adaptability to various flight conditions throughout a flight envelope. The airfoil member comprises at least one motor or actuator, a system controller, a plurality of vehicle performance sensors, at least one temperature controller and airfoil member comprising at least one geometric morphing device that is adjustable in both size and shape and one or more rigid members.

20 Claims, 5 Drawing Sheets

U.S. PATENT DOCUMENTS

| | | | |
|---|---|---|---|
| 5,374,011 | A | 12/1994 | Lazarus |
| 5,398,885 | A | 3/1995 | Andersson |
| 5,661,259 | A | 8/1997 | Cipolla |
| 5,662,294 | A | 9/1997 | Maclean |
| 5,686,003 | A | 11/1997 | Ingram |
| 5,845,878 | A | 12/1998 | Rauckhorst |
| 5,908,176 | A | 6/1999 | Gilyard |
| 6,015,115 | A | 1/2000 | Dorsett |
| 6,182,929 | B1 | 2/2001 | Martin |
| 6,199,796 | B1 | 3/2001 | Reinhard |
| 6,282,929 | B1 | 9/2001 | Eller |
| 6,283,411 | B1 | 9/2001 | Giamati |
| 6,347,769 | B1 | 2/2002 | To |
| 6,443,394 | B1 | 9/2002 | Weisend |
| 6,499,952 | B1 | 12/2002 | Jacot |
| 6,520,452 | B1 | 2/2003 | Crist et al. |
| 6,536,714 | B2 | 3/2003 | Gleine |
| 6,622,974 | B1 | 9/2003 | Dockter |
| 6,786,457 | B2 | 9/2004 | Dockter |
| 6,834,835 | B1 | 12/2004 | Knowles |
| 6,910,661 | B2 | 6/2005 | Dockter |
| 6,979,050 | B2 | 12/2005 | Browne |
| 6,986,855 | B1 | 1/2006 | Hood |
| 6,991,280 | B2 | 1/2006 | McKnight |
| 7,059,664 | B2 | 6/2006 | Aase |
| 7,147,271 | B2 | 12/2006 | Aase |
| 7,178,395 | B2 | 2/2007 | Browne et al. |
| 7,195,210 | B2 | 3/2007 | Hamilton et al. |
| 7,320,457 | B2 | 1/2008 | Heim et al. |
| 2004/0000619 | A1 | 1/2004 | Barriety |
| 2004/0069906 | A1 | 4/2004 | Dockter et al. |
| 2004/0069907 | A1 | 4/2004 | Dockter et al. |
| 2005/0056731 | A1 | 3/2005 | Hamilton et al. |
| 2005/0121240 | A1 | 6/2005 | Aase et al. |
| 2006/0169837 | A1 | 8/2006 | Bird et al. |
| 2008/0035788 | A1 | 2/2008 | Kothera et al. |

FOREIGN PATENT DOCUMENTS

| | | |
|---|---|---|
| GB | 1090962 | 11/1967 |
| GB | 1281236 | 7/1972 |

OTHER PUBLICATIONS

Miller, J.O. et al., "Structural Fabric Program," Accession No. AD0274309, Mar. 1962, available from Defense Technical Information Center, http://stinet.dtic.mil/.

Goodyear Aerospace Corp., "Airmat Materials Investigation of One-Place Inflatoplane GA-468," Accession No. AD0263004, Jun. 1961, available from Defense Technical Information Center, http://stinet.dtic.mil/.

"Shape Memory Polymers-A Short Tutorial" printed from http://www.crgrp.net/tutorials/smp1.htm on Dec. 18, 2006 CRG, Inc.

"Veriflex(R) Shape Memory Polymer" printed from http://www.crgrp.net/veriflex.htm on Dec. 18, 2006 CRG, Inc.

"CRG Partner in Morphing Wing Structures Program" printed from http://www.crgrp.net/morphing.htm on Dec. 18, 2006, CRG, Inc.

"Morphing Systems—An Overview" printed from http://www.crgrp.net/morphingsystems.htm on Dec. 18, 2006, CRG, Inc.

COMPOSITE MATERIAL FOR GEOMETRIC MORPHING WING

RELATED APPLICATION

This application is a divisional of U.S. patent application Ser. No. 11/612,244, filed Dec. 18, 2006) entitled "Composite Material for Geometric Morphing Wing," which is related to U.S. patent application Ser. No. 10/357,022, filed Feb. 3, 2003) entitled "Fiber Matrix for a Geometric Morphing Wing", both of which are incorporated by reference herein.

FIELD OF THE INVENTION

This application relates generally to aeronautical vehicle systems, and more particularly, to an apparatus, system, and method of altering the size and shape of an airfoil wing member.

BACKGROUND OF THE INVENTION

Airfoil members such as wings, horizontal and vertical stabilizers, canards, rotor blades, winglets, etc. are limited in ability to change their sizes and shapes so as to alter surfaces of the airfoil member and be adaptable to multiple flight conditions of a flight envelope.

Currently, airfoil member surfaces of an aircraft can be modified to a certain extent by various devices for improved flight characteristics such as during low-speed takeoff and descent, autopilot maneuvering, or for high-speed aerodynamics. Aircraft that need to operate in several performance environments, however, often must compromise flight performance by using airfoil members that do not provide suitable characteristics in multiple environments rather than using airfoil members that are specifically designed for a particular flight situation.

Aircraft designs known today utilize a variety of airfoil member surface modifying devices such as, flaps, slats, flaperons, ailerons, split ailerons, or other leading or trailing edge devices known in the art, to provide control forces and moments during flight. Also, other devices such as micro flow devices, zero mass jets, and the like are used to control the airflow over the airfoil member to further control forces and moments.

Additionally, devices such as smart materials are used to slightly the modify shape of the airfoil member itself or of the airfoil member surface modifying devices. However, all of there devices are limited in their ability to alter shape, size, and characteristics of the airfoil member; the airfoil member devices typically only modify a single aspect of the airfoil member, minimally affect airflow, or slightly modify shape of the airfoil member.

Furthermore, all of the above-stated devices tend to use motors or actuators and other mechanical components to perform minor changes in an airfoil surface.

Military aircraft have utilized mechanically swept wings for improved aerodynamics during high-speed flight. These mechanical surface systems, however, typically only provide a very limited ability to affect airfoil member shape and aerodynamic flight characteristics of the aircraft. The limited ability to significantly change airfoil member shape can result in an airfoil member that is particularly suitable for only a limited range of a flight envelope.

It is therefore desirable to provide an airfoil member and an airfoil member altering system that significantly modifies shape and size of the airfoil member and at the same time provides an airfoil member with increased adaptability for various flight conditions throughout a flight envelope. An airfoil member with improved adaptability may potentially be capable of supporting greater payloads at lower speeds and during take-off and landing of an aircraft, better aerodynamic characteristics at high speed, and increased flight range.

The copending application Ser. No. 10/357,022 as referenced above, as well as U.S. Pat. No. 6,786,457, teaches geometric morphing of an airfoil by changing the inflated state of the inflatable members in the airfoil.

SUMMARY OF THE INVENTION

This application describes an apparatus, system and method of altering the size and shape of an airfoil member. The airfoil member comprises at least one motor or actuator, a system controller, a plurality of vehicle performance sensors, at least one temperature controller, and an airfoil member comprising at least one geometric morphing device that is adjustable in both size and shape and preferably one or more rigid members. The geometric morphing device comprises a fiber mesh, a matrix material, four bars interconnected to wherein the fiber mesh is enclosed, and pins to each of which two adjacent bars are pivotally connected. The elastic properties of the airfoil matrix material are susceptible to an external stimulus, preferably a change in its temperature induced by cooling or heating the matrix material. When a change in the size and/or shape of at least a section of the airfoil is desired, the temperature modulator coupled to the section of the airfoil is actuated and a change in the local temperature causes the matrix material of the section to switch from a substantially stiff form to an elastically deformable form. The motor or actuator coupled to the section of the airfoil is subsequently actuated to cause a change in the shape and/or size of the section of the airfoil. When the desired shape and/or size have been achieved, the temperature modulator changes the temperature and returns the section of the airfoil to a stiff form, locking it into the new shape and/or size.

This device has several advantages over existing airfoil member altering devices. One advantage is that an airfoil member is provided that is capable of significantly changing its size and shape. Versatility of the device also allows shape of the airfoil member to alter in compound manners. The ability to significantly change in size and shape provides increased application versatility and increased flight control throughout a flight envelope.

Another advantage is that it provides improved adaptability, improved flight characteristics including supporting greater payloads at lower speeds, and during take-off and landing, better aerodynamic characteristics at higher speeds, and increased flight range in comparison with traditional airfoil member altering devices that are limited in one or more of the above-stated characteristics.

DETAILED DESCRIPTION OF THE PREFERRED EMBODIMENT

Figure 1:
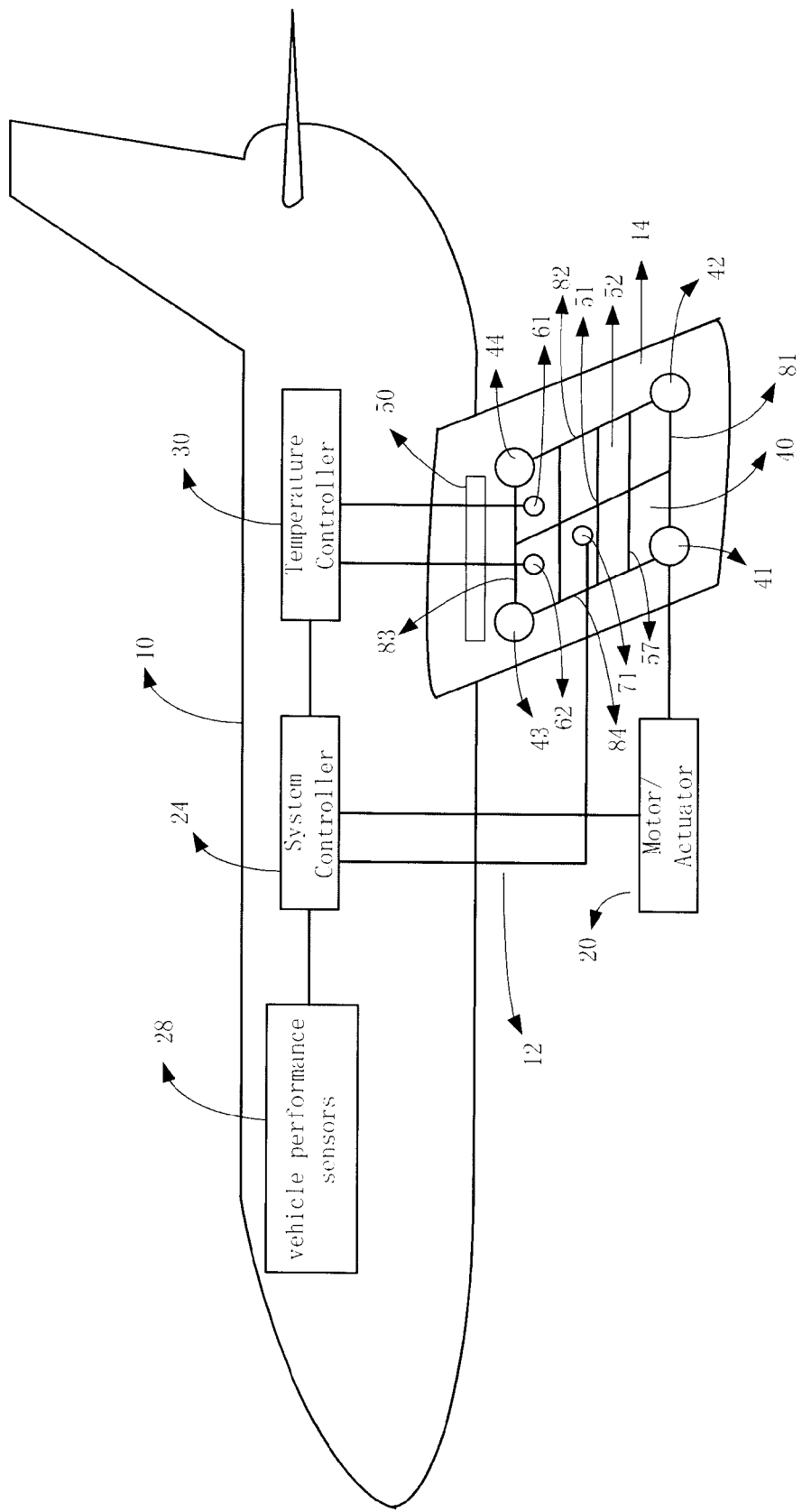
FIG. 1 is a perspective and schematic view of an aircraft that is utilizing an airfoil member altering system in accordance with a first embodiment.

In each of the following figures, the same reference numerals are used to refer to the same components. While this application describes an apparatus, system, and method of altering size and shape of an airfoil member, the apparatus, system and method may be adapted for various applications including ground-based vehicles, aeronautical vehicles, including fixed wing and rotary wing aircraft, watercraft, and other applications known in the art that require the use of airfoil members. The apparatus, system and method may be applied to vertical stabilizers to increase control at lower speeds and to decrease drag at higher speeds, to winglets for modifying flight speed, and as well as to horizontal and canard surfaces. The apparatus, system and method may be applied to flaps and ailerons to modify shape of an airfoil member. The apparatus, system and method may also be used to modify flight control by changing the size and shape of a first airfoil in a first manner and by maintaining a second wing in a current state or by changing the size and shape of the second airfoil in a second manner, thus causing rolling, pitching, or yawing moments.

In the following description, various operating parameters and components are described for one constructed embodiment. These specific parameters and components are included as examples and are not meant to be limiting.

Also, in the following description the term "morphing" refers to ability of an object or device to change. The term "geometric morphing device" refers to the ability of a device to change in size and shape. For example, an airfoil member is capable of changing in size and shape where parameters including but not limited to span, chord, and camber of the airfoil member are adjustable.

Referring now to FIG. 1, a perspective and schematic view of an aircraft 10 that is utilizing an airfoil member altering system 12 is shown. The airfoil member altering system 12 may comprise at least one motor or actuator 20, a system controller 24, a plurality of vehicle performance sensors 28, at least one temperature controller 30, and an airfoil member 14 comprising at least one geometric morphing device 40 that is adjustable in both size and shape and preferably one or more rigid member 50.

A system controller 24 may be electrically coupled to the motor or actuator 20, a temperature controller 30, and to preferably one or more sensors 71 embedded in the morphing device 40 for monitoring temperature, pressure, etc. The system controller 24 is also electrically coupled to multiple aircraft devices including vehicle performance sensors 28 and aircraft control inceptors (not shown). The system controller 24 may be coupled to other aircraft devices and may determine the positions of the control inceptors for constant vehicle operating states such as a constant altitude mode or constant velocity mode. The system controller 24 determines multiple size and shape of the morphing device 40 for multiple flight conditions throughout a flight envelope.

The motor or actuator 20 is controlled by the system controller 24, and coupled to the morphing device 40. Although only one motor or actuator is shown, more than one motor or actuator can be employed for one morphing device 40, especially when the shape/size of the morphing device needs to be controlled precisely or when a complex shape is desired. In addition, more than one motor or actuator is preferably used to independently control each of the morphing devices in the event multiple morphing devices are present.

A temperature controller 30 is controlled by the system controller 24, and coupled to at least one temperature sensor 61 embedded in the morphing device 40 and at least one heating/cooling element 62 embedded in the morphing device 40. Of course, preferably more than one temperature sensor 61 is used to provide a measurement of temperature distribution within the morphing device 40 and more than one heating/cooling element 62 is used to provide a more precise and uniform temperature shift within the morphing device 40. The system controller 24 can also rely on the temperature sensor 61, via the temperature controller 30, to acquire temperature of the morphing device 40, thus forgoing a directly connected temperature sensor in the one or more sensors designated by 71.

The system controller 24 and the temperature controller 30 may be microprocessor based such as a computer having a central processing unit, memory (RAM and/or ROM), and associated input and output buses. The system controller 24 and the temperature controller 30 may be a portion of a central main control unit, a flight controller, an integrated controller, or may be stand-alone controllers as shown.

The vehicle performance sensors 28 may include vehicle external air pressure sensors, velocity sensors, acceleration sensors, moment sensors, altitude sensors, or other sensors known in the art. The vehicle performance sensors 28 may determine a current velocity and acceleration of the aircraft 10, as well as determining a current moment about a yaw heading or z-axis, a pitch or x-axis, and roll or y-axis.

The morphing device 40 comprises a fiber mesh 51, a matrix material 52, four bars 81, 82, 83 and 84 interconnected to form a rectangular shape wherein the mesh 51 is enclosed, and pins 41, 42, 43 and 44 to each of which two adjacent bars are pivotally connected. More complex shapes can be certainly obtained using more bars.

The fiber mesh 51 is a braided/overlay of multiple fibers 57 that provides rigidity to the morphing device 40. The fiber mesh 51 may be formed of steel fibers, composite fibers such as kevlar or zylon, aluminum fibers, or other fibers known in the art with high tensile strength. The fiber mesh 51 may also have varying tensile strength across the morphing device 40. The fiber mesh can be embedded within the matrix material 52, overlaid above or underneath the matrix material 52, or enclose the matrix material 52. The fiber mesh 51 may have a uniform, patterned, diverse, or varying fiber angle distribution. Maximum width of the morphing device is dependent upon the density distribution of the fibers. Also the density of the fibers or the number of fibers per square inch area of the morphing device 40 may be diverse depending on the location of the morphing device on the aircraft.

The matrix material 52 can be any material known in the art whose elastic deformability can be significantly altered by a controllable stimulus. While all suitable stimuli can be used, such as electrical, light and magnetic stimuli, the most preferred stimulus is the change in the temperature of the matrix material induced by a heating/cooling element 62. One or more temperature sensors 61 are provided to allow accurate monitoring of the temperature of the matrix material 52. One preferred material for use as matrix material is a shape memory polymer known by the trademark VERIFLEX®, produced by CRG Industries, LLC. Using thermal stimuli, shape memory polymers can exhibit a radical change from a rigid polymer to a very elastic state, then back to a rigid state again. In its elastic state, it will recover its "memory" shape if left unrestrained. However, while pliable it can be stretched, folded or otherwise conformed to other shapes, tolerating up to 200% elongation. While manipulated, the shape memory polymer can be cooled and therefore returned to a rigid state, maintaining its manipulated shape indefinitely. This manipulation process can be repeated many times without degradation. The shape memory polymer known by the trademark VERIFLEX® is preferred at least in part due to its large range of customizable thermal activation temperature (−30° C. to 260° C.). Extremely high temperatures and cryogenic ranges may be possible.

VERIFLEX® is the registered trademark for CRG, Inc.'s family of shape memory polymer resin systems which function on thermal activation at from −30° C. to 260° C. (−20° F. to 500° F.). Using thermal or other stimuli, the shape memory polymers can exhibit a radical change from a rigid polymer to a very elastic state then back to a rigid shape again. In its elastic state, it will recover its "memory" shape if left unrestrained. However while pliable it can be stretched, folded or otherwise conformed to other shapes, tolerating up to 200% elongation. VERIFLEX® when heated above its transition temperature becomes elastic and can be manipulated into a different shape and then cooled to maintain the new shape in a rigid state. When reheated above its transition temperature, it will return to its memory shape if unrestrained (see http://www.crgrp.net/veriflex.htm).

Although in FIG. 1, for simplicity, a single geometric morphing device 40 is shown for a single airfoil member 14, the apparatus, system and method may utilize multiple airfoil members each of which having multiple morphing devices. The airfoil preferably comprises one or more rigid members 50 for providing enhanced structural integrity. Since the morphing device 40 is rendered substantially deformable while undergoing a morphing process, it is highly desirable to incorporate one or more rigid members into the airfoil member to maintain the overall structural integrity of the airfoil member.

Figure 2:
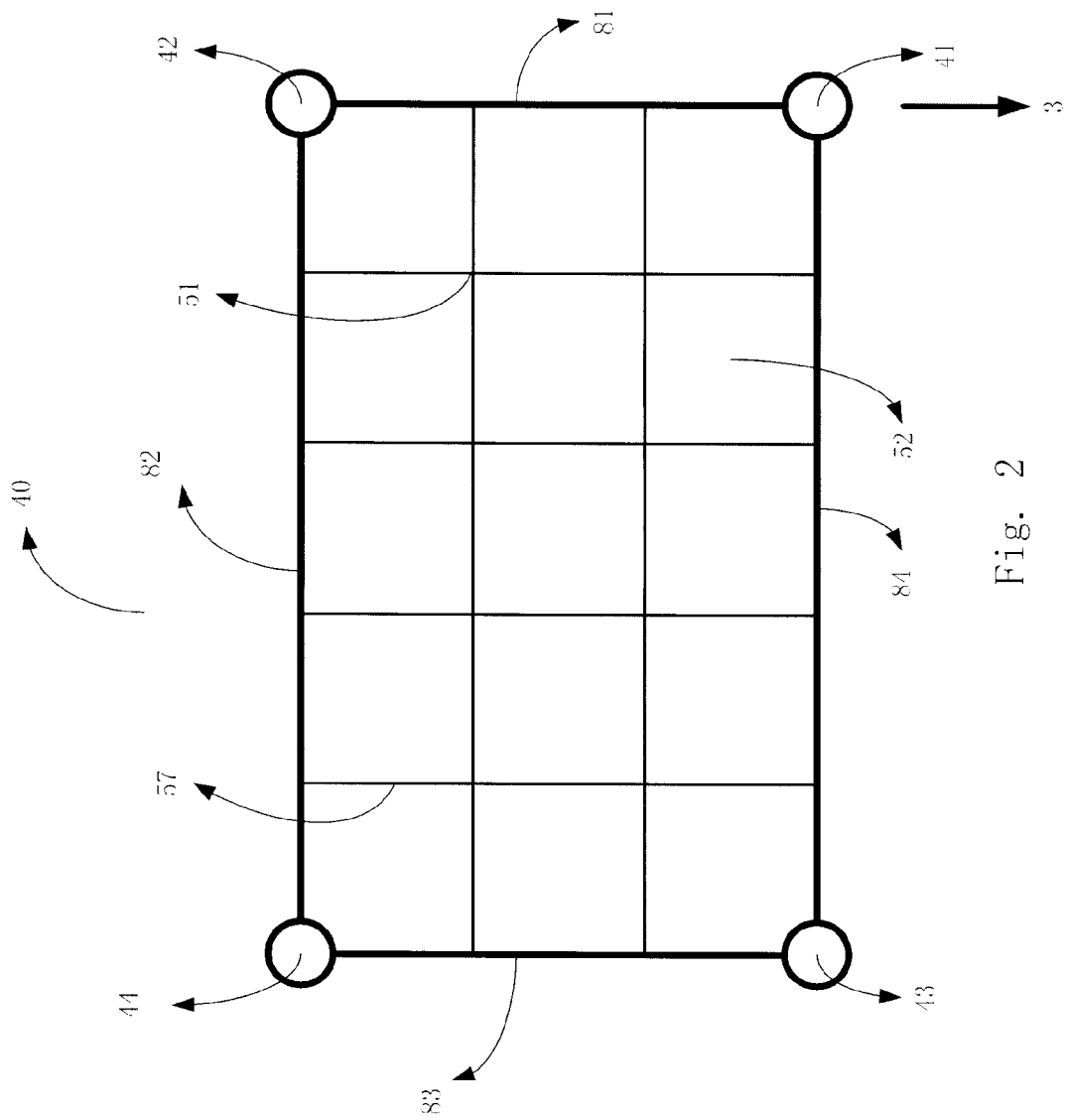
FIG. 2 is a plan view of the morphing device for use with the airfoil member altering system in accordance with the first embodiment, before morphing is initiated.
Figure 3:
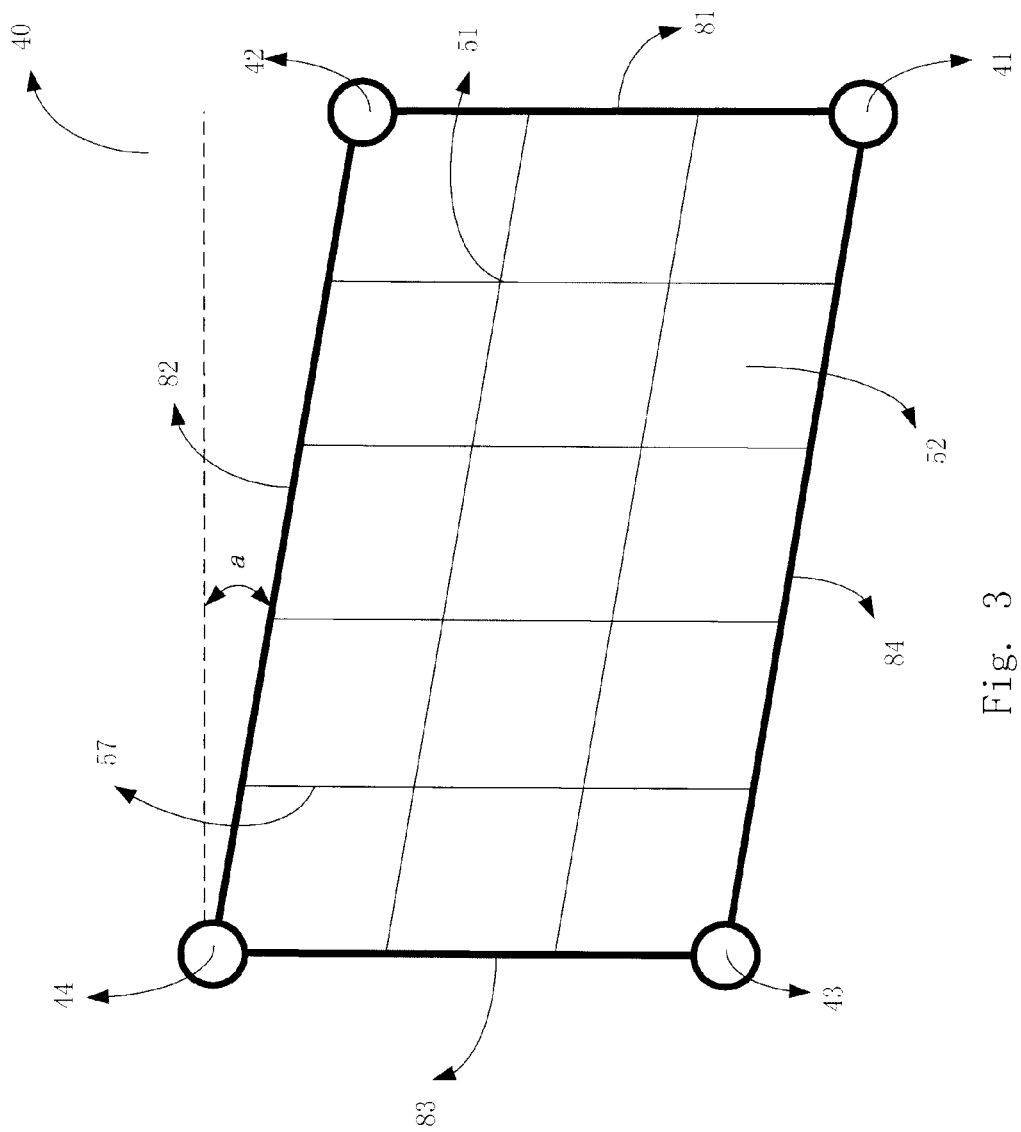
FIG. 3 is a plan view of the morphing device for use with the airfoil member altering system in accordance with the first embodiment, after morphing is finished.

The method of accomplishing the geometric morphing is illustrated in FIGS. 2 and 3.

FIG. 2 shows a morphing device 40 in an unaltered form, i.e., a steady state condition. The composite comprising the fiber mesh 51 and the matrix material 52 is supported by four bars. For example, in the rectangularly shaped morphing device 40, two long bars 82 and 84 with length L and two short bars 81 and 83 with length b are provided. Pins 41, 42, 43, and 44 are used to connect the ends of each bar to the two neighboring bars and the four bars are allowed to pivot at the junctures. The fiber mesh 51 is attached, at the ends of the fibers 57, to the bars. Each fiber has an initial tension T. The area defined by the rectangular morphing device is $A1=b \cdot L$.

When morphing is desired, the temperature of the matrix material is adjusted, by the heating/cooling element 62, to a value wherein the matrix material changes from a substantially rigid solid form to a deformable form with enhanced elasticity.

When the desired temperature has been achieved and the matrix material is softened, mechanical manipulation of the bars by the motor/actuator is relied upon to change the shape/size of the morphing device. A representative morphing is accomplished by the displacement of the right-hand side vertical bar 81 in an embodiment linearly, such as downward (shown as the direction of the arrow 3 in FIG. 2). The downward movement by bar 81 causes a rotation of the upper and lower bars, 82 and 84 respectively, to pivot about the left-hand side vertical bar 83 to achieve the parallelogram. During the rotation, the pins 44 and 43 do not move, while the pins 41 and 42 move downward along with the right-hand bar 81. When the desired shape/size of the morphing device is achieved, such as the parallelogram shown in FIG. 3, the temperature of the matrix material is returned to its pre-morphing level, and the matrix material hardens and keeps the morphing device in its new form. In the morphed state shown in FIG. 3, an angle a is shown, which is larger than 0° but less than 90° and swept by the bars 82 and 84 during the rotation. Not only the morphing device possesses a new shape, but also it occupies a different area, which is $A2=b \cdot L \cdot \cos(\alpha)$. The ratio of the two areas $R=A2/A1$ equals $\cos(\alpha)$. To achieve an adequate reduction of area, the ratio R is desired to be equivalent to ½, requiring an angle of $\alpha=60°$. It is to be noted that the morphed shape is a backward swept wing plan form and a forward swept wing plan form can be easily achieved by moving the right-hand bar 81 upward while and rotating bars 82 and 84 relative to the bar 83. Furthermore, tension in the fibers is still uniformly distributed and no substantially increase in tension is incurred compared to the pre-morphing state illustrated in FIG. 2.

Figure 4:
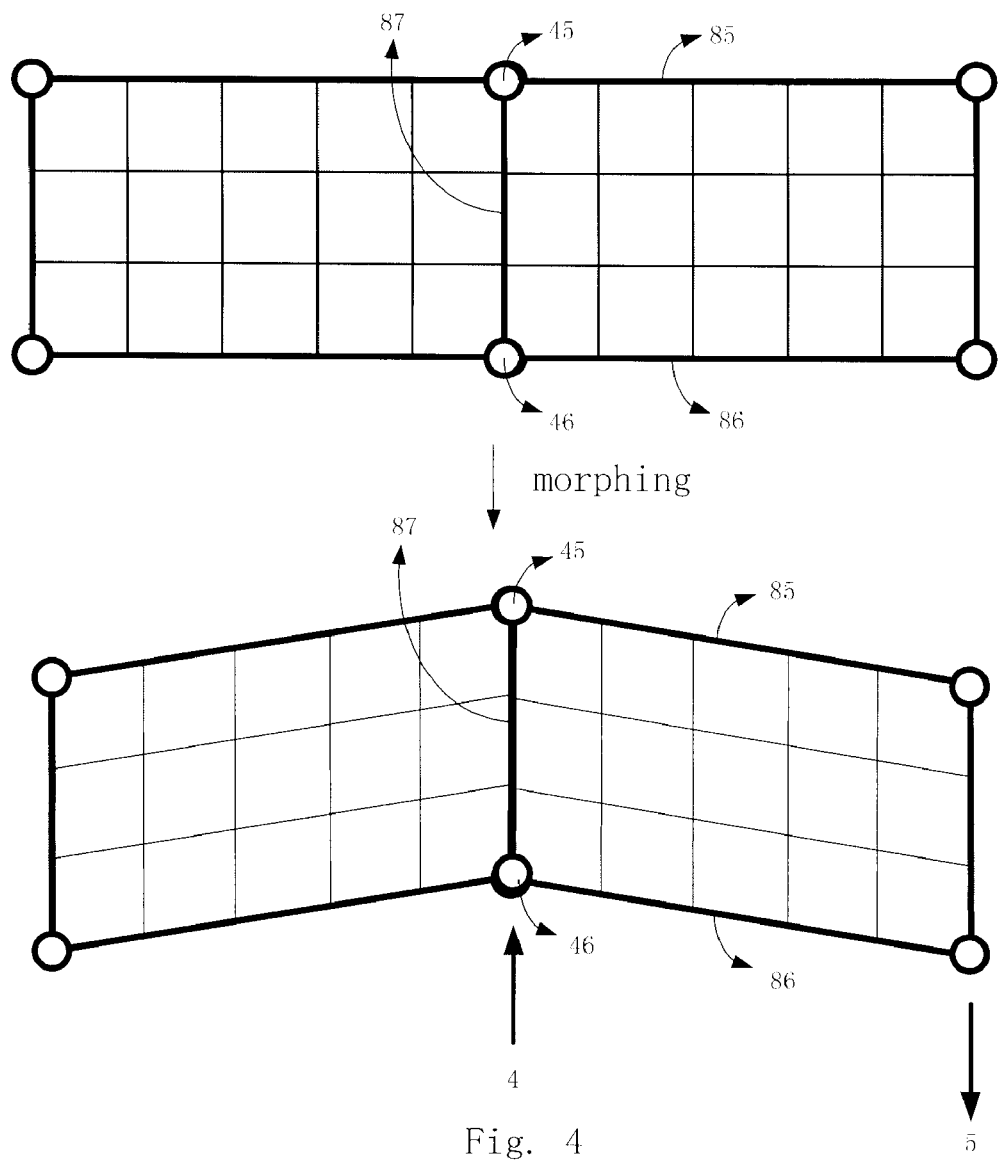
FIG. 4 is a plan view of the morphing device for use with the airfoil member altering system in accordance with the first embodiment, before and after morphing is conducted, wherein more than one bar is actuated to achieve a more complex shape.
Figure 5A:
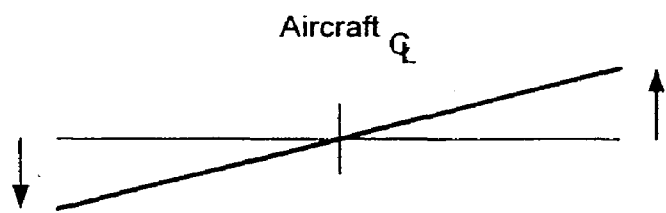
FIGS. 5A-5D are schematic views of additional configurations of morphed shapes for use with the airfoil member altering system.
Figure 5B:
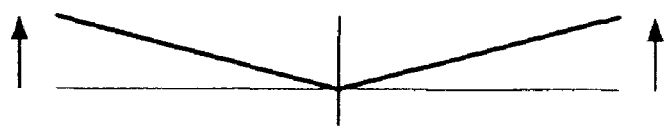
Figure 5C:
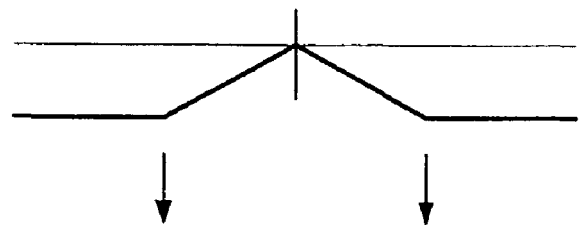
Figure 5D:
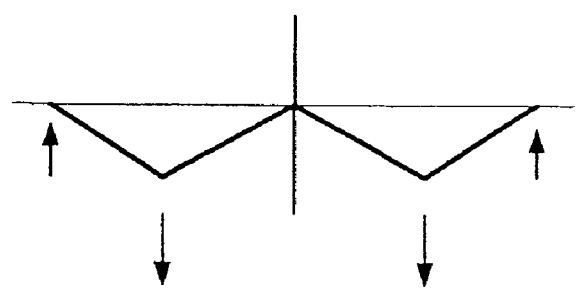

While only one motor/actuator 20 is shown in FIG. 1 coupled to the single morphing device 40, more than one motor/actuator can be used to operate on more than one position of the morphing device, resulting in a more accurate control or accomplishing a more complicated shape. By using multiple motors/actuators or one motor/actuator with more than one controlled connection to the morphing device, unlimited number of morphed shapes can be achieved. For example, as shown in FIG. 4, a Delta wing shape can be produced from a rectangular-shaped wing shape. Compared to the morphing device shown in FIG. 2, the morphing device in FIG. 4 comprises two additional horizontal bars 85 and 86, two additional pins 45 and 46 and an additional vertical bar 87 (parts equivalent to those shown in the embodiment in FIGS. 2 and 3 are not shown for the sake of clarity). The two pins 45 and 46 and the additional bar 87 are located in the middle of the morphing device, together dissecting the fiber mesh and matrix into two sections. The Delta wing can be accomplished by moving the middle bar 85 upward (direction shown by arrow 4) while simultaneously move the right-hand bar 81' downward (direction shown by arrow 5).

The above-described steps in the above methods are meant to be an illustrative example; the steps may be performed synchronously, continuously, or in a different order depending on the application.

The apparatus, system and method may be applied in a rotary aircraft, whereby a forward moving rotary blade has a different shape than a retreating rotary blade, for improved lift distribution. The apparatus, system and method may also be used to minimize rotor noise during dynamic operation.

The apparatus, system and method may also be applied to a canard rotor wing aircraft to reverse an airfoil and increase or decrease span of a canard rotor to improve performance during a vertical lift mode or hover mode and during a fixed wing mode or cruise mode.

The apparatus, system and method provides an airfoil member that is capable of being significantly altered in size and shape to provide increased performance throughout one or more flight envelopes. The apparatus, system and method is capable of improving performance of an aircraft at multiple flight speeds including at lower speeds by changing stall speed and lift of an airfoil member and at higher speed by reducing drag while maintaining optimal lift.

The above-described apparatus and method, to one skilled in the art, is capable of being adapted for various applications and systems known in the art.

We claim:

1. A method of altering an airfoil member on an aircraft comprising the steps of:
   providing an airfoil member altering system, having a single wing structure, the system comprising at least one motor or actuator, a system controller, a plurality of vehicle performance sensors, at least one temperature controller, and the airfoil member;
   said airfoil member comprising a geometric morphing device adjustable in size and/or shape;
   said geometric morphing device including a matrix material comprising a shape memory polymer, a high tensile strength fiber mesh embedded in the matrix material to form a fiber mesh-matrix material composite, and peripherally located bars inter-connected at their ends by a pivot, said fiber mesh-matrix material composite being attached to said bars;
   adjusting the temperature of the matrix material to a first temperature where the matrix material changes from a substantially rigid solid form to a deformable form with enhanced elasticity;
   activating the motor or actuator to move said peripherally located bars such that they pivot at their ends and adjust the shape of the wing structure in a minimum of two dimensions; and
   adjusting the temperature of the matrix material below the first temperature such that the matrix material hardens and maintains the geometric morphing device in the desired shape/size.

2. The method according to claim 1 wherein a single motor/actuator is relied on to change the shape/size of the morphing device.

3. The method according to claim 1 wherein more than one motor/actuator is relied on for changing the size and shape of the morphing device.

4. The method according to claim 1, wherein:
   the shape of the mesh-matrix material composite is altered based on input from the vehicle performance sensors.

5. The method according to claim 1, wherein:
   the temperature of the mesh-matrix material composite is determined by a temperature sensor embedded in the morphing device.

6. The method according to claim 1, wherein:
   the vehicle performance sensors determine a current velocity and acceleration of the aircraft.

7. The method according to claim 1, wherein:
   the vehicle performance sensors determine a current moment about a yaw heading, a pitch, and a roll.

8. The method according to claim 1 wherein activating the motor or actuator to adjust the shape/size of the geometric morphing device comprises:
   displacing at least one of said inter-connected bars, thereby changing the shape of the fiber mesh-matrix material composite.

9. The method according to claim 8, wherein:
   the entire shape of said fiber mesh-matrix material composite is altered in a minimum of two dimensions.

10. The method according to claim 9, further comprising:
    displacing more than one of said inter-connected bars, such that the shape of the fiber mesh-matrix material composite is changed in a minimum of two dimensions.

11. The method according to claim 10, wherein:
    there are more than four inter-connected bars, some of which are located within the mesh-matrix material composite, and
    displacing more than one of said inter-connected bars comprises displacing at least one of the bars that is located within the mesh-matrix material composite, thereby achieving a change in shape of the mesh-matrix material composite in a minimum of two dimensions.

12. A method of altering an airfoil member on an aircraft comprising the steps of:
    providing an airfoil member altering system having a single wing structure, the system comprising at least one motor or actuator, a system controller, a plurality of vehicle performance sensors, at least one temperature controller, and the airfoil member;
    said airfoil member comprising at least one geometric morphing device adjustable in size and/or shape;
    said geometric morphing device including a matrix material comprising a shape memory polymer, a high tensile strength fiber mesh embedded in the matrix material to form a fiber mesh-matrix material composite, said matrix material and said fiber mesh being formed from a material whose elastic deformability can be significantly altered by a controlled stimulus, and peripherally located bars inter-connected at their ends by a pivot, said fiber mesh-matrix material composite being attached to said bars; and
    each of said at least one morphing device is independent controlled by a corresponding one of said at least one motor or actuator;
    adjusting the temperature of the matrix material to a first temperature where the matrix material changes from a substantially rigid solid form to a deformable form with enhanced elasticity;
    activating the motor or actuator to move said peripherally located bars such that they pivot at their ends and adjust the shape of the wing structure in a minimum of two dimensions; and
    adjusting the temperature of the matrix material below the first temperature such that the matrix material hardens and maintains the geometric morphing device in the desired shape/size.

13. The method according to claim 12, wherein:
    the shape of the mesh-matrix material composite is altered based on input from the vehicle performance sensors.

14. The method according to claim 12, wherein:
    the entire shape of said fiber mesh-matrix material composite is altered in a minimum of two dimensions.

15. The method according to claim 14, further comprising:
    displacing more than one of said inter-connected bars, such that the shape of the fiber mesh-matrix material composite is changed in a minimum of two dimensions.

16. The method according to claim 15, wherein:
    there are more than four inter-connected bars, some of which are located within the mesh-matrix material composite, and
    displacing more than one of said inter-connected bars comprises displacing at least one of the bars that is located within the mesh-matrix material composite, thereby achieving a change in shape of the mesh-matrix material composite in a minimum of two dimensions.

17. A method of altering an airfoil member on an aircraft comprising the steps of:
    providing an airfoil member altering system having a single wing structure, the system comprising at least one motor or actuator, a system controller, a plurality of vehicle performance sensors, at least one temperature controller, and the airfoil member;
    said airfoil member comprising at least one geometric morphing device adjustable in size and/or shape;
    said geometric morphing device including a matrix material comprising a shape memory polymer, a high tensile strength fiber mesh embedded in the matrix material to form a fiber mesh-matrix material composite, said matrix material and said fiber mesh being formed from a material whose elastic deformability can be significantly altered by a controlled stimulus, and at least four peripherally located bar inter-connected at their ends by a pivot, said fiber mesh-matrix material composite being attached to said bars; and each of said at least one morphing device is independent controlled by a corresponding one of said at least one motor or actuator;

adjusting the temperature of the matrix material to a first temperature where the matrix material changes from a substantially rigid solid form to a deformable form with enhanced elasticity;

activating the motor or actuator to move said peripherally located bars inter-connected at their ends by a pivot, such that they pivot at their ends and adjust the shape of the wing structure in a minimum of two dimensions; and adjusting the temperature of the matrix material below the first temperature such that the matrix material hardens and maintains the geometric morphing device in the desired shape/size.

18. The method according to claim 17, wherein:
the entire shape of said fiber mesh-matrix material composite is altered in a minimum of two dimensions.

19. The method according to claim 18, further comprising:
displacing more than one of said inter-connected bars, such that the shape of the fiber mesh-matrix material composite is changed in a minimum of two dimensions.

20. The method according to claim 19, wherein:
there are more than four inter-connected bars, some of which are located within the mesh-matrix material composite, and displacing more than one of said inter-connected bars comprises displacing at least one of the bars that is located within the mesh-matrix material composite, thereby achieving a change in shape of the mesh-matrix material composite in a minimum of two dimensions.

* * * * *